(12) United States Patent
Oishii et al.

(10) Patent No.: US 9,239,511 B2
(45) Date of Patent: Jan. 19, 2016

(54) FOCAL PLANE SHUTTER AND OPTICAL APPARATUS

(71) Applicant: SEIKO PRECISION INC., Narashino-shi (JP)

(72) Inventors: Seiichi Oishii, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/621,705

(22) Filed: Feb. 13, 2015

(65) Prior Publication Data

US 2015/0253646 A1 Sep. 10, 2015

(30) Foreign Application Priority Data

Mar. 5, 2014 (JP) ................................. 2014-043284

(51) Int. Cl.
 *G03B 9/42* (2006.01)
(52) U.S. Cl.
 CPC ........................................ *G03B 9/42* (2013.01)
(58) Field of Classification Search
 CPC .............. G03B 9/40; G03B 9/42; G03B 9/60
 See application file for complete search history.

(56) References Cited

U.S. PATENT DOCUMENTS

| 4,091,401 | A  | * | 5/1978 | Watanabe | ................. | G03B 9/62 396/480 |
| 8,011,838 | B2 | * | 9/2011 | Sakai | ........................ | G03B 9/60 396/488 |
| 2014/0286632 | A1 | * | 9/2014 | Oishi | ........................ | G03B 9/36 396/463 |
| 2015/0253646 | A1 | * | 9/2015 | Oishii | ........................ | G03B 9/42 396/470 |

FOREIGN PATENT DOCUMENTS

JP      H06-24821     6/1994

* cited by examiner

Primary Examiner — W B Perkey
(74) *Attorney, Agent, or Firm* — Kratz, Quintos & Hanson, LLP

(57) ABSTRACT

A focal plane shutter includes: a board including an opening; blades opening and closing the opening; an electromagnet supported by the board; a drive lever adsorbed to and held by the electromagnet, and swingably supported by the board; a drive arm connected to the drive lever, swingably supported by the board, and driving the blades; a first biasing member always biasing the drive lever away from the electromagnet and moving the blades; a first adjusting member that stepwisely adjusts a biasing force of the first biasing member; a second biasing member always biasing the drive arm in a direction opposite to a biasing direction of the first biasing member to such an extent that the blades are moved in accordance with the biasing force of the first biasing member; and a second adjusting member that steplessly adjusts a biasing force of the second biasing member.

9 Claims, 9 Drawing Sheets

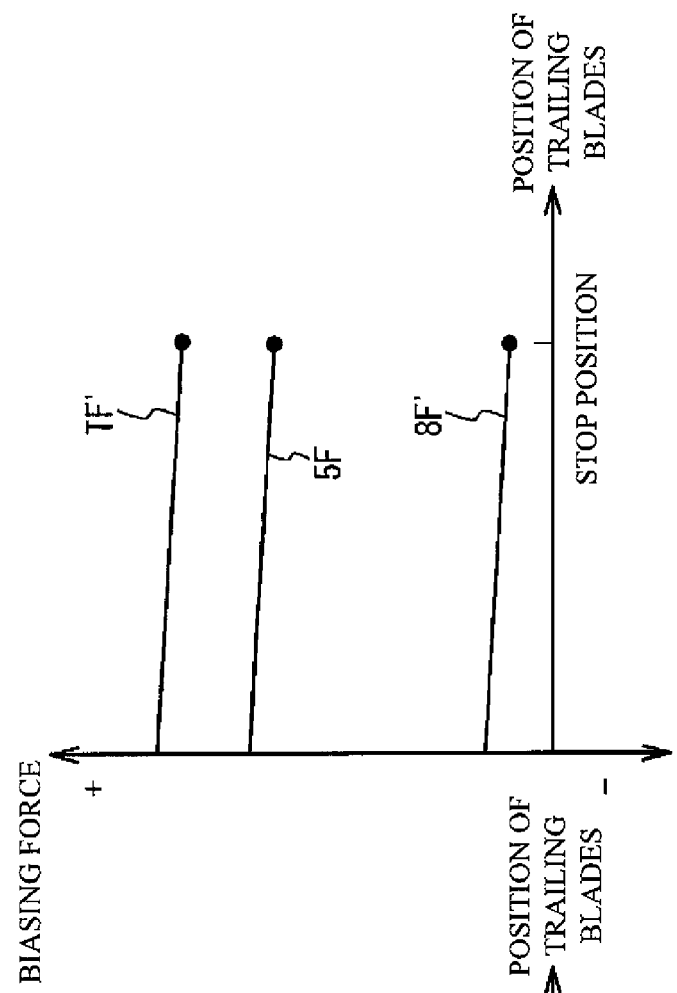
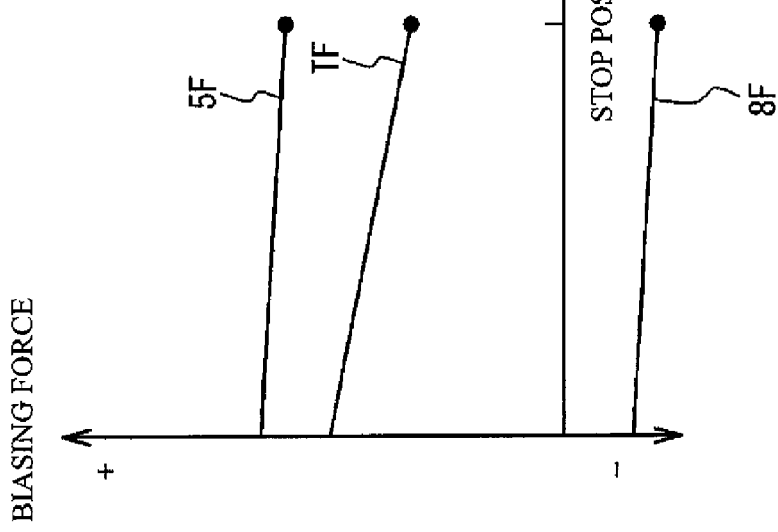
FIG. 7A
FIG. 7B

FOCAL PLANE SHUTTER AND OPTICAL APPARATUS

CROSS-REFERENCE TO RELATED APPLICATION

This application is based upon and claims priority to Japanese Patent Application No. 2014-043284 filed on Mar. 5, 2014, subject matter of this patent document is incorporated by reference herein in its entirety.

BACKGROUND (i) Technical Field

The present invention relates to focal plane shutters and optical apparatus.

(ii) Related Art

Japanese Examined Utility Model Application Publication No. 06-024821 discloses a focal plane shutter provided with: a coil spring for movement to move blades; and a spring for fine adjustment to finely adjust the movement speed of the blades.

In Japanese Examined Utility Model Application Publication No. 06-024821, the biasing direction of the spring for fine adjustment is the same as that of the coil spring for movement. Thus, the blades are biased in the same direction by the two springs, so that the large impact is applied to the blades when the moving blades are stopped. For this reason, the blades might be damaged. In particular, the high shutter speed type of the focal plane shutter needs high-speed blades, so that the large impact might be applied to the blades when the blades are stopped. Thus, there is a large possibility that the impact might damage the blades.

SUMMARY

It is therefore an object of the present invention to provide a focal plane shutter including: a board including an opening; blades opening and closing the opening; an electromagnet supported by the board; a drive lever adsorbed to and held by the electromagnet, and swingably supported by the board; a drive arm connected to the drive lever, swingably supported by the board, and driving the blades; a first biasing member always biasing the drive lever away from the electromagnet and moving the blades; a first adjusting member that stepwisely adjusts a biasing force of the first biasing member; a second biasing member always biasing the drive arm in a direction opposite to a biasing direction of the first biasing member to such an extent that the blades are moved in accordance with the biasing force of the first biasing member; and a second adjusting member that steplessly adjusts a biasing force of the second biasing member.

BRIEF DESCRIPTION OF THE DRAWINGS

FIG. 7A is a graph of changes in biasing forces of biasing members from the time when trailing blades start moving to the time when the trailing blades are stopped, and FIG. 7B is a graph of changes in biasing forces of biasing members from the time when trailing blades of an comparative example start moving to the time when the trailing blades are stopped;

DETAILED DESCRIPTION

Figure 1:
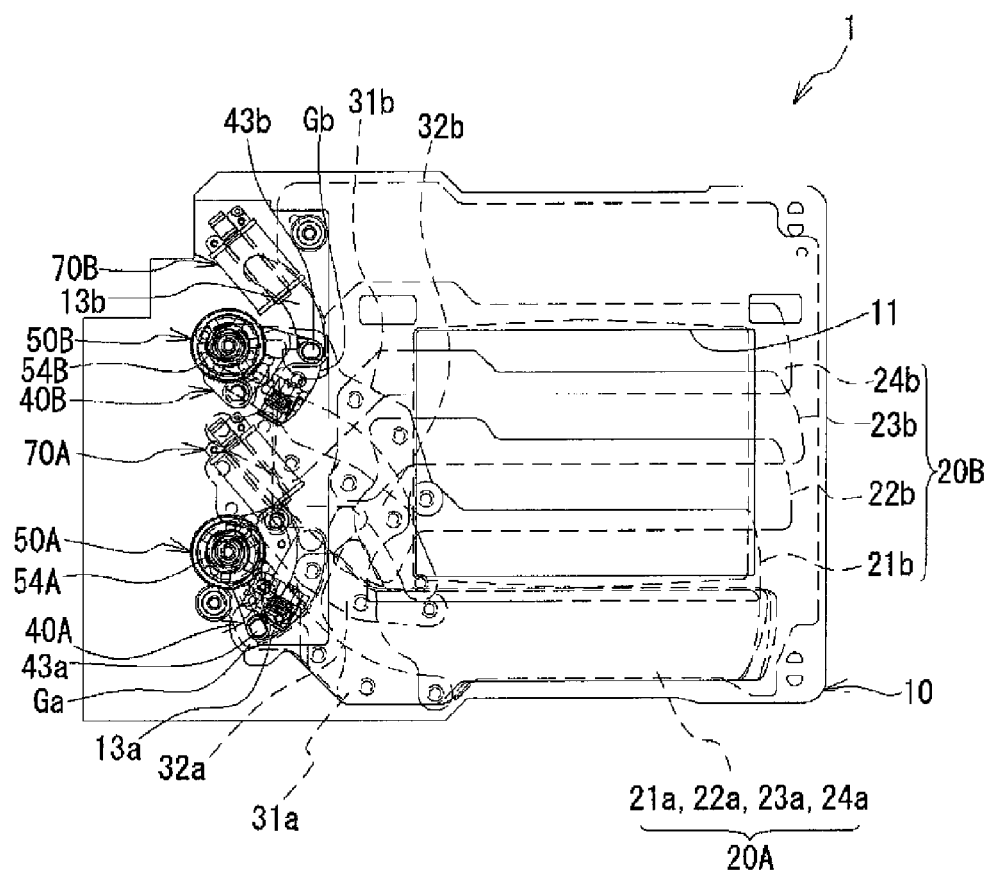
FIG. 1 is front view of a focal plane shutter according to the present embodiment.

An embodiment will be described later with reference to the drawings. FIG. 1 is a front view of a focal plane shutter 1. As illustrated in FIG. 1, the focal plane shutter 1 includes: a board 10; blades 21a to 24a and 21b to 24b; drive arms 31a and 31b; support arms 32a and 32b; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, although made of a synthetic resin, each of the blades 21a to 24a and 21b to 24b may be made of a metal or a fiber reinforced resin. Although being a metal thin plate, each of the drive arms 31a and 31b and the support arms 32a and 32b is made of a synthetic resin.

Four blades 21a to 24a configure leading blades 20A. Four blades 21b to 24b configure trailing blades 20B. The leading blades 20A and the trailing blades 20B open and close the opening 11. FIG. 1 illustrates the leading blades 20A in an overlapped state and the trailing blades 20B in an expanded state. In FIG. 1, the leading blades 20A recedes from the opening 11 and the trailing blades 20B close the opening 11. Each of the leading blades 20A and the trailing blades 20B are movable between a closing position to close the opening 11 and a receding position to recede from the opening 11.

The leading blades 20A are connected to the drive arm 31a and the support arm 32a. The trailing blades 20B are connected to the drive arm 31b and the support arm 32b. These drive arms 31a and 31b, and the support arms 32a and 32b are swingably supported by the board 10.

Drive levers 40A and 40B for respectively driving the drive arms 31a and 31b are provided in the board 10. The drive levers 40A and 40B are supported by the board 10 to be swingable in a predetermined range. Specifically, the drive lever 40A is supported to swing about a spindle provided in the board 10. This configuration is applied to the drive lever 40B. The drive levers 40A and 40B correspond to drive members driving the leading blades 20A and the trailing blades 20B, respectively. The drive levers 40A and 40B are each made of a synthetic resin.

The drive arm 31a is connected to the drive lever 40A. The drive arm 31b is connected to the drive lever 40B. The swinging of the drive lever 40A causes the drive arm 31a to swing, thereby moving the leading blades 20A. Likewise, the swinging of the drive lever 40B causes the drive arm 31b to swing, thereby moving the trailing blades 20B.

Specifically, the drive levers 40A and 40B are provided with drive pins 43a and 43b fitted into the drive arms 31a and 31b, respectively. The board 10 is provided with arch-shaped escape slots 13a and 13b for respectively escaping the drive pins 43a and 43b. End portions of the escape slots 13a and 13b are provided with rubbers Ga and Gb for buffering the drive pins 43a and 43b, respectively.

The drive levers 40A and 40B each holds an iron piece which does not have a reference numeral. The drive lever 40A can swing between the position where the iron piece abuts the electromagnet 70A and the position where the iron piece recedes from the electromagnet 70A. That is, the drive lever 40A is movable such that the iron piece moves toward and away from the electromagnet 70A. This is applied to the drive lever 40B.

Figure 4:
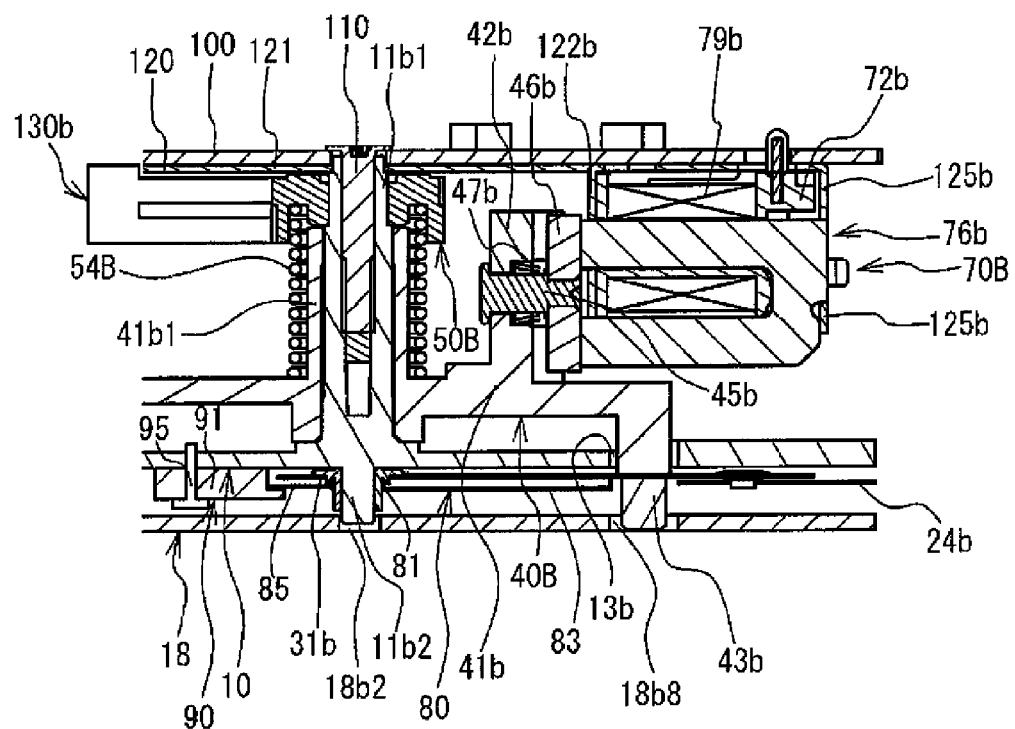
FIG. 4 is a sectional view around an electromagnet and a drive lever adsorbed to and held by the electromagnet.

Also, the drive lever 40A is biased by a spring, not illustrated, in such a direction that the iron piece moves away from the electromagnet 70A. Likewise, the drive lever 40B is biased by a spring, not illustrated, in such a direction that the iron piece moves away from the electromagnet 70B. Additionally, FIG. 4 illustrates the iron piece and the spring of the drive lever 40B, as will be described later.

Ratchet wheels 50A and 50B engage the drive levers 40A and 40B, respectively, through the springs mentioned above. One end of the spring, which biases the drive lever 40A in such a direction as to move away from the electromagnet 70A, engages the ratchet wheel 50A. The other end of the spring engages the drive lever 40A. The rotational amount of the ratchet wheel 50A is adjusted, thereby adjusting the biasing force of the spring. The ratchet wheel 50B also has a function similar to the ratchet wheel 50A.

The electromagnet 70A is energized, thereby adsorbing the iron piece of the drive lever 40A against the biasing force of the above spring. Likewise, the electromagnet 70B is energized, thereby adsorbing the iron piece of the drive lever 40B against the biasing force of the above spring.

Figure 2:
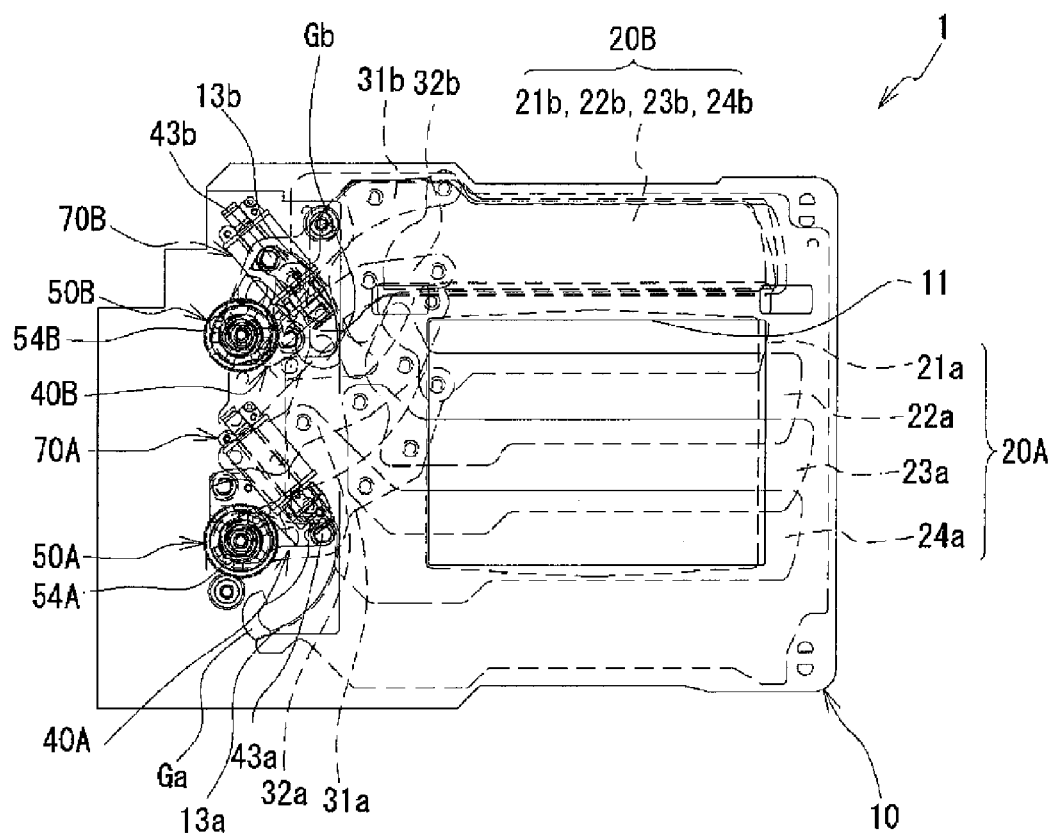
FIG. 2 is an explanatory view of an operation of the focal plane shutter.
Figure 3:
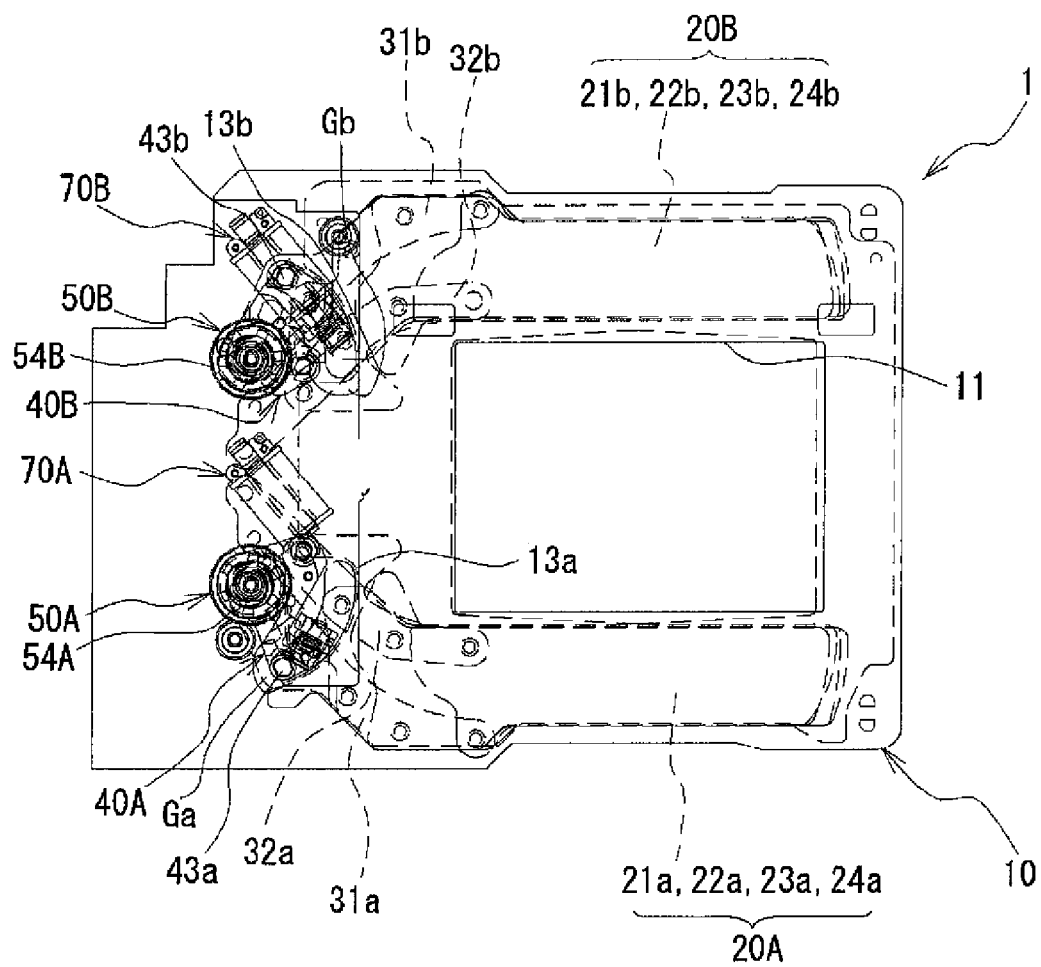
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, a set lever not illustrated is secured to an initial position, the leading blades 20A are expanded to close the opening 11, and the trailing blades 20B are overlapped with each other to recede from the opening 11. In this initial state, the iron pieces of the drive levers 40A and 40B abut the electromagnets 70A and 70B respectively, and are set to be adsorbed thereto.

In shooting, a release button of the camera is pushed to energize coils of the electromagnets 70A and 70B, whereby the iron piece of the drive lever 40A is adsorbed to the electromagnet 70A and the iron piece of the drive lever 40B is adsorbed to the electromagnet 70B. After that, the set lever moves away from the drive levers 40A and 40B. At this time, the drive levers 40A and 40B remain adsorbed to the electromagnets 70A and 70B, respectively.

Afterward, the energization of the coil of the electromagnet 70A is stopped, thereby rotating the drive lever 40A clockwise by the biasing force of the spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

After a predetermined period lapses from a time when the release button is pushed, the energization of the coil of the electromagnet 70B is stopped, and then the drive lever 40B rotates clockwise by the biasing force of the spring. Therefore, the trailing blades 20B are expanded to close the opening 11. The drive lever 40B abuts an end portion of the slot formed in the board 10. FIG. 1 illustrates the state just after the exposure operation is finished. In such a way, one cycle of shooting is finished.

Next, the drive lever 40A and the drive lever 40B are rotated counterclockwise by the set lever not illustrated. Therefore, the leading blades 20A are expanded to close the opening 11 and the trailing blades 20B are overlapped with each other to recede from the opening 11, whereby the state is returned to the initial state illustrated in FIG. 2.

Next, the electromagnet 70B will be described in detail. FIG. 4 is a sectional view around the drive lever 40B and the electromagnet 70B in the state where the drive lever 40B is adsorbed to and held by the electromagnet 70B.

The drive lever 40B includes: a board-shaped base portion 41b; a cylindrical portion 41b1 and a drive pin 43b standing on the base portion 41b; a holding portion 42b holding an iron piece 46b; and the like. Around the cylindrical portion 41b1, there are provided the ratchet wheel 50B and a spring 54B for giving the drive lever 40B a biasing force. One end of the spring 54B is secured to the drive lever 40B side, and the other end of the spring 54B is secured to the ratchet wheel 50B side. The rotational amount of the ratchet wheel 50B is adjusted, thereby adjusting the biasing force of the spring 54B. The spring 54B biases the drive lever 40B in such a direction as to move away from the electromagnet 70B.

A spindle 11b1 provided in the board 10 is fitted into the cylindrical portion 41b1. The drive lever 40B rotates about the spindle 11b1 in a predetermined range. The spindle 11b1 is secured at its end with a holding board 120 by a pin 110. A printed circuit board 100 is secured on an upper surface of the holding board 120. The holding board 120 holds the electromagnets 70A and 70B. The printed circuit board 100 controls the energization of the electromagnets 70A and 70B.

The drive pin 43b extends downwardly from the base portion 41b. The drive pin 43b is fitted onto the drive arm 31b. A spindle 11b2 is coaxially formed with the spindle 11b1 in the board 10. The drive arm 31b rotatably fits onto the spindle 11b2. The drive arm 31b rotates about the spindle 11b2 in a predetermined range.

The holding portion 42b has a wall shape standing upwardly on the base portion 41b. A pin 45b fitted into the iron piece 46b penetrates through the holding portion 42b. The pin 45b penetrates through the holding portion 42b in such a manner as to move in a given range in an axial direction of the pin 45b. A spring 47b biases the holding portion 42b and the iron piece 46b such that they move away from each other, and is arranged therebetween. The spring 47b has a function to absorb an impact at the time when the iron piece 46b abuts an iron core 76b of the electromagnet 70B as will be described later.

A rear board 18 faces the board 10. The drive arm 31b, the trailing blades 20B, and the like are housed between the board 10 and the rear board 18. The rear board 18 is formed with an escape slot 18b8 and an escape hole 18b2 for escaping the drive pin 43b and the spindle 11b2, respectively.

The electromagnet 70B includes: the iron core 76b; a coil 79b for exciting the iron core 76b; and a bobbin 72b around which the coil 79b is wound. The energization of the coil 79b generates the magnetic attraction force between the iron core 76b and the iron piece 46b. The iron core 76b has a letter U shape. The end surface of the end portion of the iron core 76b is adsorbed with the iron piece 46b. The coil 79b is electrically connected to a pattern formed in the printed circuit board 100 by soldering. Therefore, the electromagnet 70B and the printed circuit board 100 are electrically connected to each other.

The holding board 120 includes: a flat board portion 121 having a flat board shape; and a pair of sandwiching portions 122b and 125b standing on the flat board portion 121. The holding board 120 is made of a metal and has a thin board shape elastically deformable. The flat board portion 121 is secured with the printed circuit board 100. The sandwiching portions 122b and 125b stand on the flat board portion 121 to extend toward the board 10 side. The sandwiching portions 122b and 125b sandwich and hold the electromagnet 70B.

FIG. 4 illustrates an engagement member 130b engaging the ratchet wheel 50B and stopping the rotation thereof. The engagement member 130b is integrally provided in the holding board 120. The engagement member 130b is a leaf spring. An end portion of the engagement member 130b engages a gear portion provided in the outer circumferential portion of the ratchet wheel 50B, whereby the ratchet wheel 50B is stopped at a predetermined position.

The biasing force of the spring 54B is adjusted based on the stop position of the ratchet wheel 50B. The spring 54B always biases the drive lever 40B and causes the trailing blades 20B to move. As mentioned above, the engagement of the gear portion of the ratchet wheel 50B with the engagement member 130b permits the ratchet wheel 50B to stop at a predetermined position. Thus, the stoppable positions of the ratchet wheel 50B depend on the pitch of teeth of the gear portion thereof. Therefore, the stop position of the ratchet wheel 50B can be stepwisely adjusted, but cannot be steplessly adjusted. Additionally, this configuration is applied to a spring 54A the biasing force of which is adjusted by the ratchet wheel 50A and which causes the leading blades 20A to move. The spring 54B is an example of a first biasing member. The ratchet wheel 50B is an example of a first adjusting member.

An adjusting spring 80 and an adjusting mechanism 90 are arranged between the board 10 and the rear board 18, as will be described later in detail.

Figure 5:
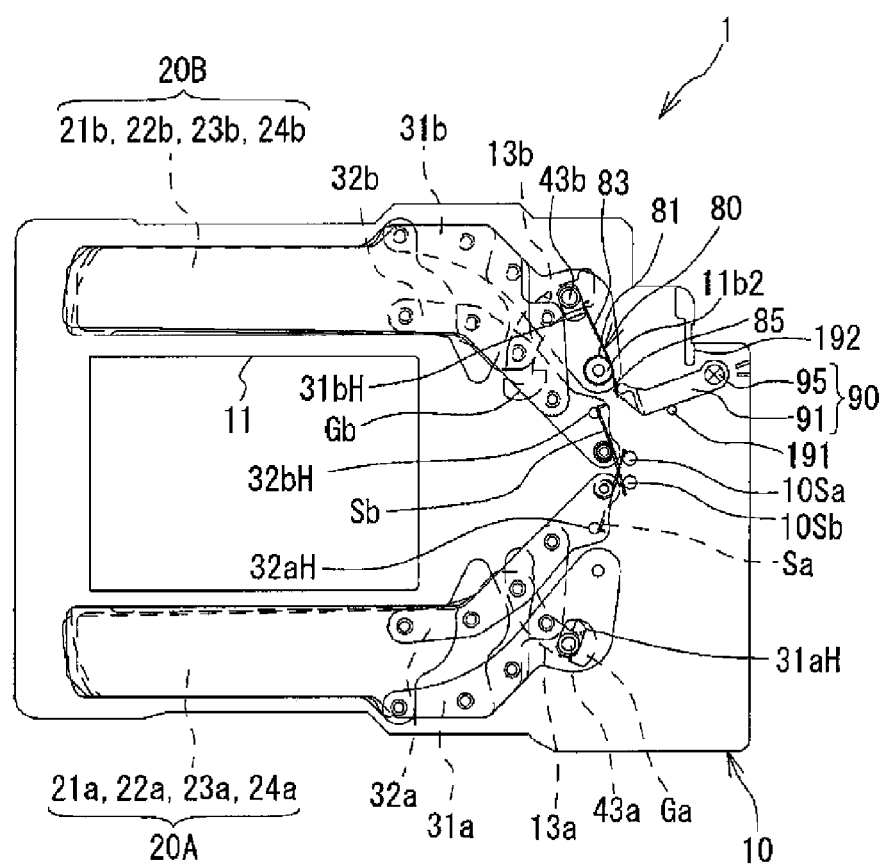
FIG. 5 is a rear view of the focal plane shutter.

FIG. 5 is a rear view of the focal plane shutter 1. The rear board 18 is omitted in FIG. 5. The support arms 32a and 32b are provided with rattle suppression springs Sa and Sb, respectively. The rattle suppression spring Sa is wound around a spindle portion supporting the support arm 32a for swinging movement. An end of the rattle suppression spring Sa engages a hole 32aH of the support arm 32a, and the other end engages a projection 10Sa formed on the board 10. Likewise, the rattle suppression spring Sb is wound around a spindle portion supporting the support arm 32b for swinging movement. An end of the rattle suppression spring Sb engages a hole 32bH of the support arm 32b, and the other end engages a projection 10Sb formed on the board 10. The rattle suppression springs Sa and Sb bias the support arms 32a and 32b to suppress rattling thereof, respectively. In addition, the rattle suppression springs Sa and Sb bias the support arms 32a and 32b respectively such that the leading blades 20A and the trailing blades 20B move away from the opening 11, respectively. The support arms 32a and 32b are examples of support arms. The rattle suppression springs Sa and Sb are examples of third biasing members.

The drive pins 43a and 43b engage holes 31aH and 31bH of the drive arms 31a and 31b, respectively. The adjusting spring 80 is provided around the spindle 11b2 of the board 10. Specifically, a coil portion 81 of the adjusting spring 80 is wound around the spindle 11b2, an arm portion 83 continuous to the coil portion 81 and extending engages the hole 31bH, and an arm portion 85 continuous to the coil portion 81 and extending engages a swing lever 91 of the adjusting mechanism 90.

The adjusting spring 80 always biases the drive arm 31b such that the trailing blades 20B move away from the opening 11. In contrast, the above described spring 54B biases the drive lever 40B such that the trailing blades 20B move toward the opening 11. Thus, the biasing directions of the adjusting spring 80 and the spring 54B are opposite to each other. Further, this does not present a problem with the movement of the trailing blades 20B trying to close the opening 11, because the biasing force of the spring 54B is greater than that of the adjusting spring 80. Additionally, although the rattle suppression spring Sb biases the support arm 32b such that the trailing blades 20B move away from the opening 11 as mentioned above, this does not present a problem with the movement of the trailing blades 20B trying to close the opening 11, because the biasing force of the spring 54B is greater than the total of the biasing forces of the rattle suppression spring Sb and the adjusting spring 80.

The adjusting mechanism 90 includes the swing lever 91 and a securing screw 95. The swing lever 91 has a rear end swingably supported by the board 10 and a front end engaging the arm portion 85. The securing screw 95 secures the swing lever 91 unable to swing. The board 10 is provided thereon with projections 191 and 192 for restricting the swing range of the swing lever 91. The angle of the swing lever 91 is adjusted and secured by the securing screw 95, whereby the swing lever 91 is secured at an arbitrary angle on the board 10.

Figure 6:
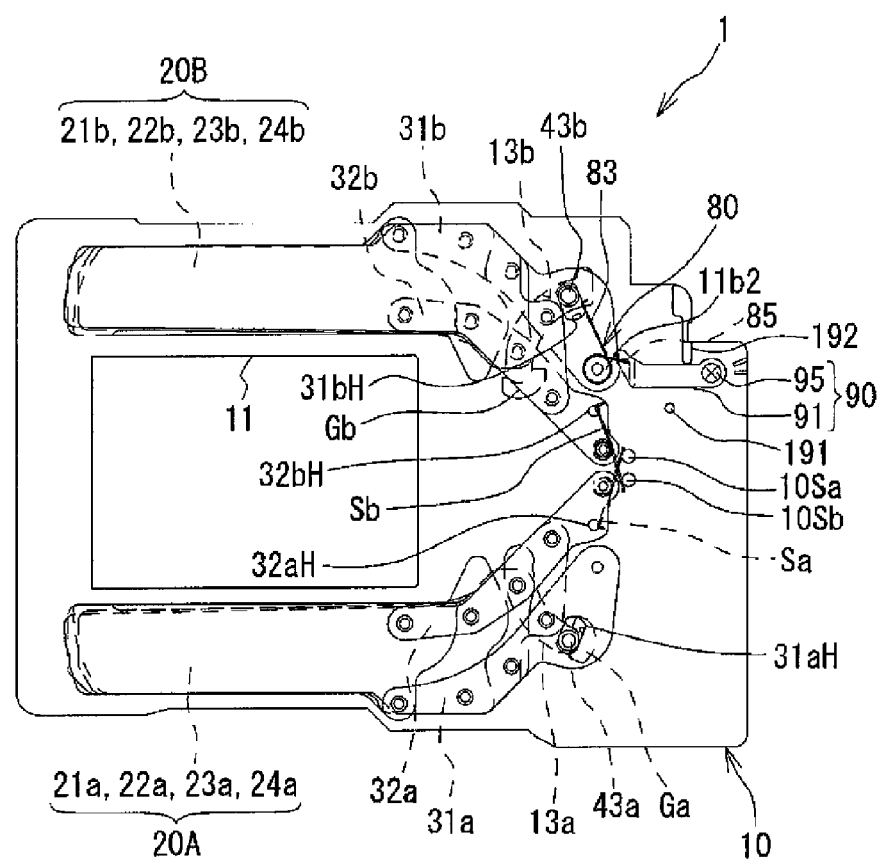
FIG. 6 is a view of a state of changing an angle of a swing lever.

FIG. 6 is a view of a state of changing an angle of the swing lever 91. As illustrated in FIG. 6, the securing screw 95 secures the swing lever 91 at an angle such that the swing lever 91 abuts the projection 192. As illustrated in FIGS. 5 and 6, a change in the position of the arm portion 85 of the adjusting spring 80 engaging the swing lever 91 changes the biasing force of the adjusting spring 80. For example, the biasing force of the adjusting spring 80 is smaller in the state of FIG. 6 than in the state of FIG. 5. In this way, the swing lever 91 is secured by the securing screw 95 in the present embodiment, so the angle of the swing lever 91 can be steplessly adjusted and secured. Therefore, the biasing force of the adjusting spring 80 can be steplessly adjusted. The adjusting spring 80 is an example of a second biasing member. The arm portions 83 and 85 are examples of the first and second arms, respectively. The adjusting mechanism 90 is an example of a second adjusting member. The swing lever 91 is an example of a swing member. The securing screw 95 is an example of a securing portion.

As mentioned above, the biasing force of the spring 54B cannot be steplessly adjusted, but the biasing force of the adjusting spring 80 is steplessly adjusted, thereby finely adjusting the movement speed of the trailing blades 20B.

FIG. 7A is a graph of changes in the biasing forces of the biasing members from the time when the trailing blades 20B start moving to the time when the trailing blades 20B are stopped. FIG. 7A illustrates changes in the biasing force 5F of the spring 54B, the biasing force 8F of the adjusting spring 80, and the total biasing force TF of these biasing forces. Additionally, to facilitate understanding, the same changing rates of the biasing forces 5F and 8F are illustrated. Further, a positive biasing force is illustrated as the biasing force causing the trailing blades 20B to move in the direction from the receding position to recede from the opening 11 to the closing position to close the opening 11. A negative biasing force is illustrated as the biasing force causing the trailing blades 20B to move in the direction from the closing position to the receding position. Thus, the biasing force 5F of the spring 54B is illustrated as the positive value, and the biasing force 8F of the adjusting spring 80 is illustrated as the negative value.

Although the biasing force 5F decreases as the trailing blades 20B come closer to the closing position, the biasing force 8F opposite to the biasing force 5F increases. Thus, the decrease rate of the total biasing force TF is greater than that of the biasing force 5F, and the total biasing force TF further decreases as the trailing blades 20B come closer to the closing position. In such a way, the total biasing force TF contributing to the movement of the trailing blades 20B decreases as the trailing blades 20B come closer to the closing position.

FIG. 7B is a graph of changes in the biasing forces of the biasing members from the time when trailing blades of an comparative example start moving to the time when the trailing blades are stopped. FIG. 7B illustrates changes in the biasing force 5F of a spring, the biasing force 8F' of an adjusting spring, and the total biasing force TF' of these biasing forces. Herein, unlike the adjusting spring 80 in the present embodiment, it is supposed that the adjusting spring in the comparative example biases a drive arm in the same direction as the biasing direction of the spring 54B. It is also supposed that a value of the biasing force 5F is the same in the present embodiment and in the comparative example. In this case, the biasing force 8F' of the adjusting spring has a positive value, and the total biasing force TF' is greater than each of the biasing force 5F and the total biasing force TF. Additionally, since the directions of the biasing forces 5F and 8F are the same in the comparative example, the decrease rate of the total biasing force TF' is smaller than that of the total biasing force TF. For this reason, when the trailing blades are stopped, the impact and the impact sound are increased in the comparative example, as compared with that of the biasing force TF.

In the present embodiment, the biasing direction of the adjusting spring 80 is opposite to that of the spring 54B, and the biasing force of the adjusting spring 80 increases as the trailing blades 20B come closer to the closing position. Thus, the total biasing force TF can be further decreased as the trailing blades 20B come closer to the closing position. That is, the speed of the trailing blades 20B can be made smaller in the stepless manner as the trailing blades 20B come closer to the closing position. Moreover, the decrease rate increases as they come closer to the closing position. It is therefore possible to suppress the impact and the impact sound when the trailing blades 20B are stopped at the closing position.

Additionally, in the present embodiment, the biasing direction of the rattle suppression spring Sb is opposite to that of the spring 54B, and the biasing force of the rattle suppression spring Sb increases as the trailing blades 20B come closer to the closing position. Thus, actually, the total biasing force TF can be made much smaller as the trailing blades 20B come closer to the closing position. It is therefore possible to suppress the impact and the impact sound when the trailing blades 20B are stopped at the closing position.

Further, the swing lever 91 of the adjusting mechanism 90 adjusting the biasing force of the adjusting spring 80 swings about a predetermined position. Thus, the angle of the swing lever 91 is changed as illustrated in FIGS. 5 and 6, so that the swingable range of the front end portion of the swing lever 91 can be ensured. Therefore, the angle of the arm portion 85 of the adjusting spring 80 engaging the front end portion of the swing lever 91 can be greatly changed. This ensures the adjustable range of the biasing force of the adjusting spring 80.

Further, as illustrated in FIG. 4, the spring 54B and the ratchet wheel 50B are arranged in one side of the board 10, whereas the adjusting spring 80 and the adjusting mechanism 90 are arranged in the other side of the board 10. Therefore, as compared with a case where these members are arranged in the same side of the board 10, the focal plane shutter 1 according to the present embodiment is suppressed from increasing in its size in the plane direction.

Figure 8A:
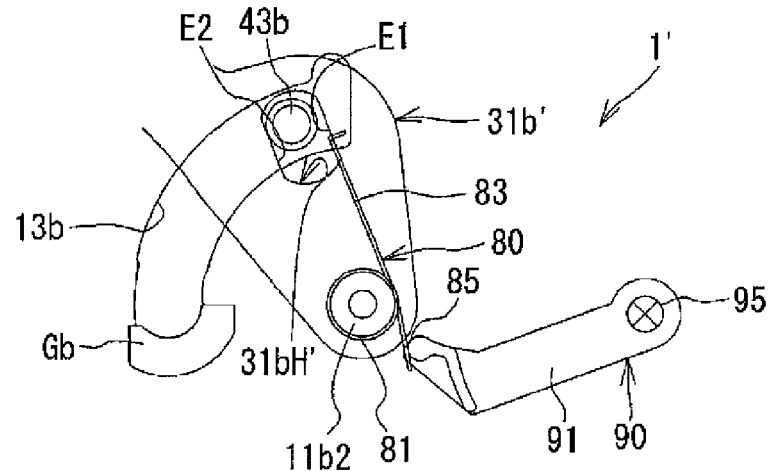
FIGS. 8A to 8C are views of states of a drive arm from the time when trailing blades of a focal plane shutter according to a variation start moving to the time when the trailing blades are stopped.
Figure 8B:
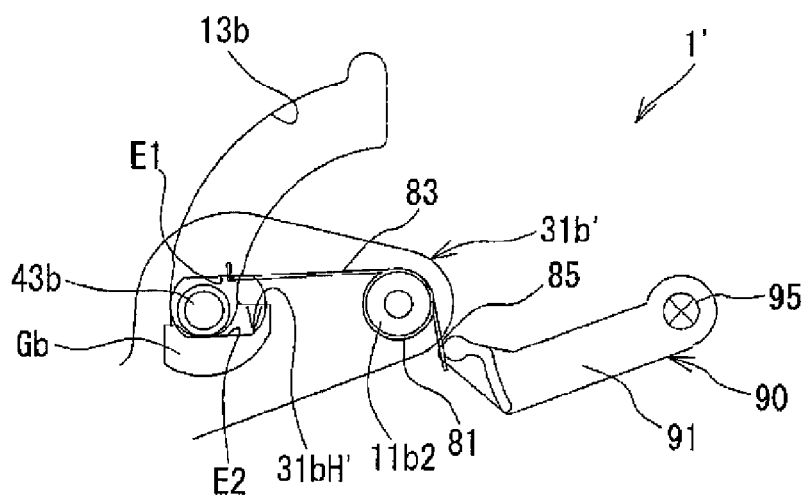
Figure 8C:
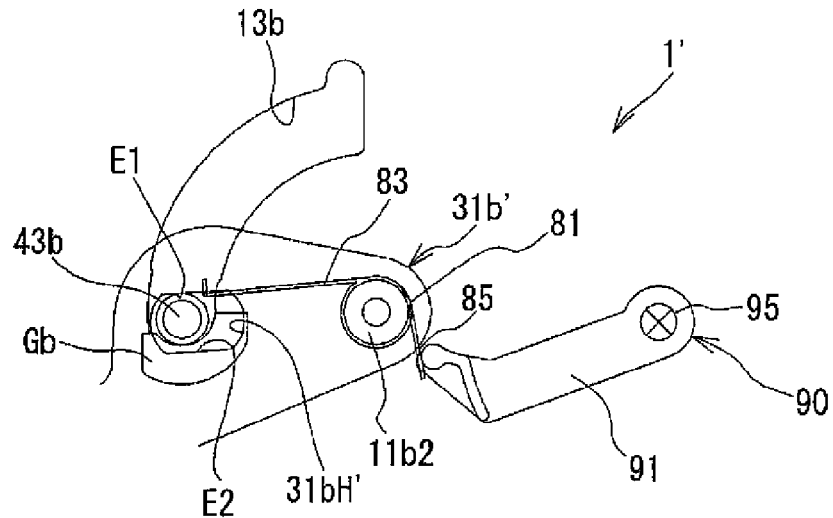

Next, a variation will be described. FIGS. 8A to 8C are views of states of a drive arm 31b' from the time when trailing blades of a focal plane shutter 1' according to the variation start moving to the time when the trailing blades are stopped. Additionally, the similar components are designated with the similar reference numerals and the duplication description is omitted. The drive arm 31b' is thin and made of a synthetic resin. A hole 31bH' of the drive arm 31b' includes edges E1 and E2 facing each other. The edge E1 is located at the movement start position side where the trailing blades start moving in the exposure operation, whereas the edge E2 is located at the movement stop position side where the trailing blades are stopped in the exposure operation. A distance between the edges E1 and E2 is greater than the outer diameter of the drive pin 43b. Thus, as illustrated in FIG. 8A, in the state where the trailing blades are stopped away from the opening, the adjusting spring 80 biases the drive arm 31b' such that the edge E2 abuts the drive pin 43b.

After the trailing blades start moving, when the drive pin 43b abuts the rubber Gb provided at the end portion of the escape slot 13b as illustrated in FIG. 8B, the drive arm 31b' tries to move further in accordance with the inertial force as illustrated in FIG. 8C. Therefore, the edge E2 moves away from the drive pin 43b, and the edge E1 abuts the drive pin 43b. After that, the inertial force exerting on the drive arm 31b' decreases, so that the edge E1 moves away from the drive pin 43b and the edge E2 abuts the drive pin 43b in accordance with the biasing force of the adjusting spring 80. As a result, the drive pin 43b and the trailing blades 20B are stopped.

As illustrated in FIGS. 8B and 8C, the direction of the biasing force of the adjusting spring 80 is opposite to that of the inertial force that exerts on the adjusting spring 80 just when the moving drive pin 43b abuts the rubber Gb. Thus, the adjusting spring 80 can reduce the inertial force that exerts on the drive arm 31b' just when the edge E1 abuts the drive pin 43b. Accordingly, for example, the deformation of the edge E1 due to the strong abutment of the edge E1 with the drive pin 43b can be suppressed.

Figure 9:
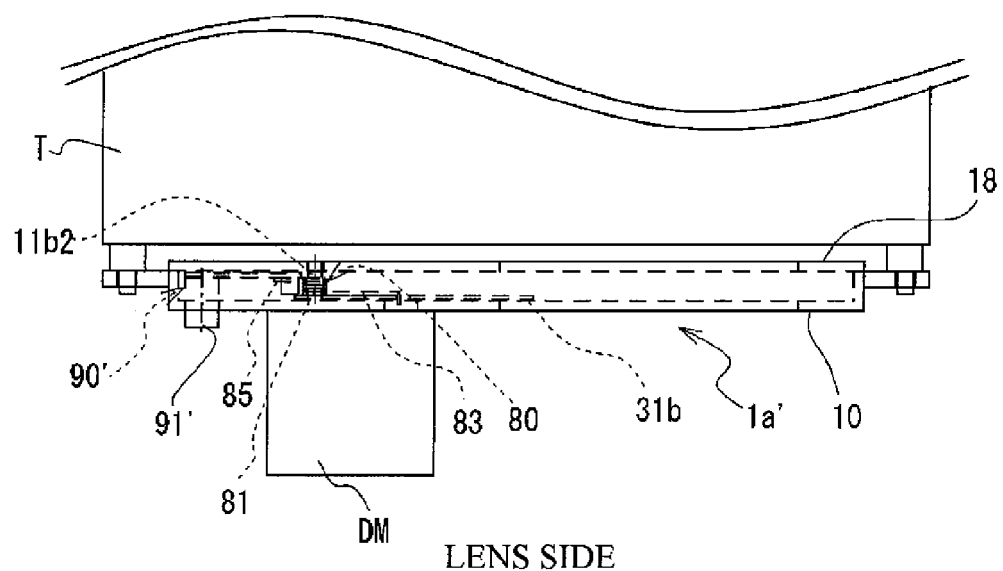
FIG. 9 is an explanatory view of adjusting speed of the trailing blades of a focal plane shutter according to a variation.

Next, a description will be given of an example of adjusting speed of the trailing blades of a focal plane shutter 1a' according to a variation. FIG. 9 is an explanatory view of adjusting speed of the trailing blades of the focal plane shutter 1a' according to the variation. The focal plane shutter 1a' is secured on a measuring device T, each movement speed of the leading blades and the trailing blades are detected, and the movement speed of the trailing blades are adjusted. The measuring device T is equipped with an image pickup element. A lens is installed in the opposite side of the measuring device T with respect to the focal plane shutter 1a'. A board 10' is provided with a drive mechanism DM for driving the leading blades and the trailing blades. The drive mechanism DM includes, for example, electromagnets as mentioned above, drive levers, ratchet wheels, and springs. FIG. 9 illustrates the simplified drive mechanism DM. The focal plane shutter 1a' is secured to the measuring device T such that the board 10' faces the lens side and the rear board 18 faces the measuring device T side. That is, the drive mechanism DM faces the lens side.

A swing lever 91' of an adjusting mechanism 90' is provided with an operating knob 97 projecting from the board 10'. An operator operates the rotation of the operating knob 97, so that the angle of the swing lever 91' can be adjusted. The operating knob 97 projects toward the lens side from the side where the drive mechanism DM is provided on the board 10', that is, the side where the electromagnets are provided on the board 10'. Thus, the operator can operate the operating knob 97 in the state where the focal plane shutter 1a' is attached to the T. Therefore, the biasing force of the adjusting spring 80 can be adjusted and the speed of the trailing blades can be adjusted in the state where the focal plane shutter 1a' is attached to the T. In this way, the working property is improved. The operating knob 97 is an example of an operation portion.

Additionally, a securing screw is screwed into the operating knob 97 from the lens side, and this securing screw secures the adjusting mechanism 90' to the board 10'. A head screw of this securing screw is located in the lens side. To adjust the angle of the swing lever 91', the securing screw is loosened and the operating knob 97 is rotated by a desired amount, and the securing screw secures the adjusting mechanism 90' to the board 10' again.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

At least one of the electromagnets 70A and 70B may be a self-holding type solenoid.

The swing lever 91 may be secured with an adhesive rather than by the securing screw 95.

The adjusting spring 80 and the adjusting mechanism 90 may be provided for the drive arm 31a. In this case, the adjusting spring 80 is arranged so as to bias the drive arm 31a in the direction opposite to the direction of the biasing force of the spring adjusted by the ratchet wheel 50A.

What is claimed is:

1. A focal plane shutter comprising:
   a board including an opening;
   blades opening and closing the opening;
   an electromagnet supported by the board;
   a drive lever adsorbed to and held by the electromagnet, and swingably supported by the board;
   a drive arm connected to the drive lever, swingably supported by the board, and driving the blades;
   a first biasing member always biasing the drive lever away from the electromagnet and moving the blades;
   a first adjusting member that stepwisely adjusts a biasing force of the first biasing member;
   a second biasing member always biasing the drive arm in a direction opposite to a biasing direction of the first biasing member to such an extent that the blades are moved in accordance with the biasing force of the first biasing member; and
   a second adjusting member that steplessly adjusts a biasing force of the second biasing member.

2. The focal plane shutter of claim 1, wherein
   an end of the second biasing member engages the drive arm, and
   the second adjusting member includes:
      a swing member engaging another end of the second biasing member and swingably supported by the board; and
      a securing portion securing the swing member not to be swung at an arbitrary angle with respect to the board.

3. The focal plane shutter of claim 2, wherein
   the drive arm includes a spindle portion swingably connected to the board, and
   the second biasing member includes:
      a coil portion wound around the spindle portion;
      a first arm portion continuous to the coil portion and engaging the drive arm; and
      a second arm continuous to the coil portion and engaging the swing member.

4. The focal plane shutter of claim 1, wherein
   the first biasing member and the first adjusting member are arranged in one side of the board, and
   the second biasing member and the second adjusting member are arranged in the other side of the board.

5. The focal plane shutter of claim 1, wherein
   the board includes a restriction portion restricting a stop position of the drive lever,
   the drive arm includes an engagement hole engaged with a drive pin of the drive lever, and
   the second biasing member buffers impact generated between the drive pin and the engagement hole when the driving drive lever abuts the restriction portion and stops.

6. The focal plane shutter of claim 1, wherein the biasing force of the second biasing member increases as the biasing force of the first biasing member decreases.

7. The focal plane shutter of claim 1, comprising:
   a support arm swingably supported by the board and connected to the blades; and
   a third biasing member that biases the support arm.

8. The focal plane shutter of claim 1, wherein the second adjusting member includes an operating portion that operates the second adjusting member from one side of the board in which the electromagnet is supported.

9. An optical apparatus comprising a focal plane shutter comprising:
   a board including an opening;
   blades opening and closing the opening;
   an electromagnet supported by the board;
   a drive lever adsorbed to and held by the electromagnet, and swingably supported by the board;
   a drive arm connected to the drive lever, swingably supported by the board, and driving the blades;
   a first biasing member always biasing the drive lever away from the electromagnet and moving the blades;
   a first adjusting member that stepwisely adjusts a biasing force of the first biasing member;
   a second biasing member always biasing the drive arm in a direction opposite to a biasing direction of the first biasing member to such an extent that the blades are moved in accordance with the biasing force of the first biasing member; and
   a second adjusting member that steplessly adjusts a biasing force of the second biasing member.

* * * * *